3,047,216
CENTRIFUGAL OIL CLEANER VIBRATION DAMPENERS
John Dolza, 15080 Fenton Road, Fenton, Mich.
Filed May 21, 1959, Ser. No. 814,828
3 Claims. (Cl. 233—32)

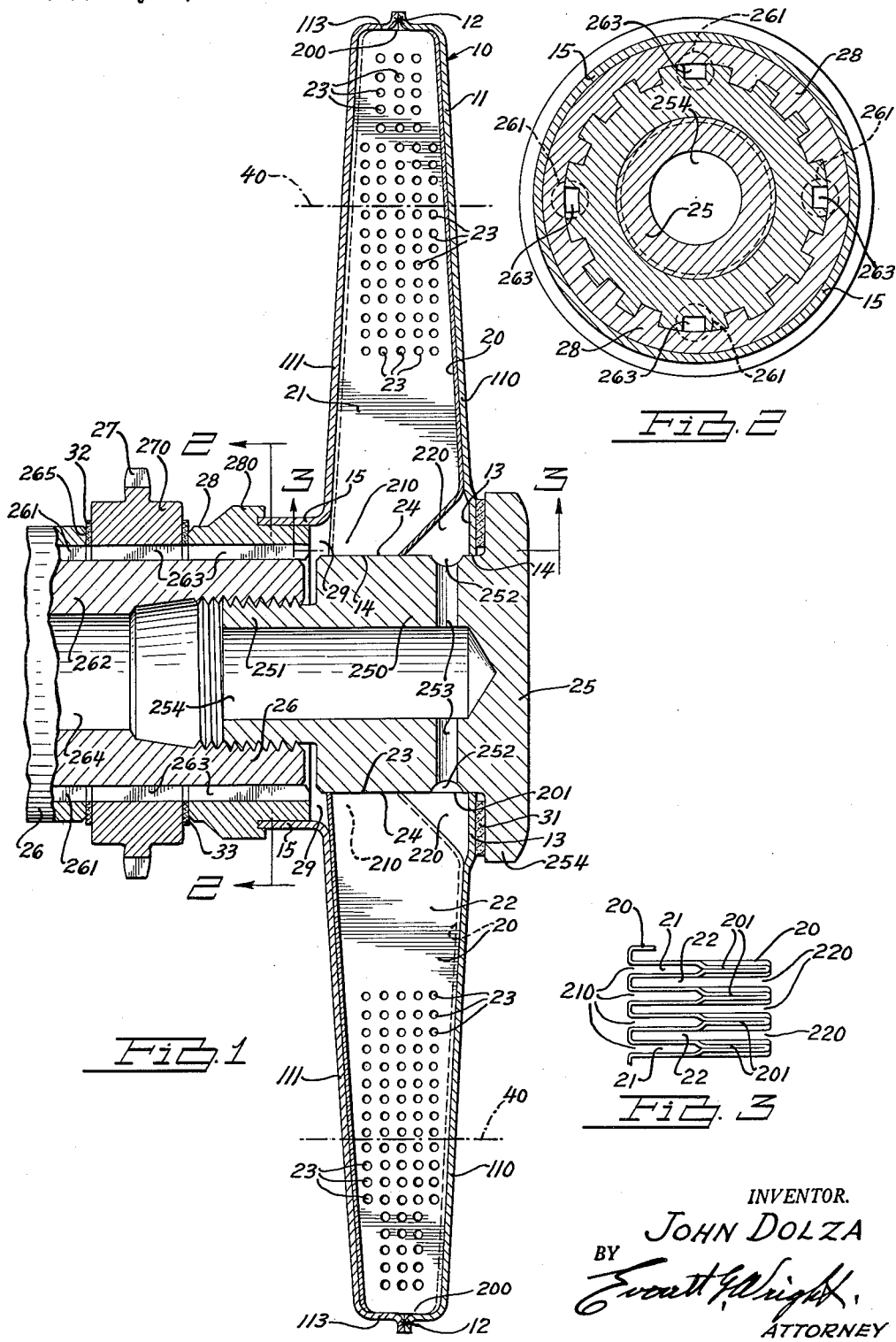

This invention relates to a combined centrifugal oil cleaner and vibration dampener for internal combustion engines and the like.

Centrifuge type oil cleaners are recognized to be highly effective in separating sludge and foreign matter from oil passing therethrough. The cost of prior art centrifuge type oil cleaners has generally prohibited their use on internal combustion engines. However, by improving their construction and utilizing the centrifugal oil cleaner also as a vibration dampener, the economics of the combined device are such as to make the use thereof highly desirable, particularly when an improved centrifugal oil cleaner-vibration dampener of the instant invention is employed.

The primary object of this invention is to provide a highly efficient, economical to manufacture and readily installed centrifugal oil cleaner for pressure circulating oil systems of internal combustion engines, the said centrifugal oil cleaner also functioning as a vibration dampener for the engine with which it is employed.

Another object of the invention is to provide a novel simplified highly efficient combined centrifugal oil cleaner-vibration dampener of an economical unitary construction for pressure circulating oil systems of internal combustion engines which may be readily installed on the engine crankshaft and removed therefrom for servicing, and which functions effectively both as a centrifuge type oil cleaner and a vibration dampener, all without any material engine power loss.

A further object of the invention is to provide in an internal combustion engine a combined centrifugal type oil cleaner and vibration dampener consisting of a cylindrical housing fixed on the engine crankshaft, said crankshaft having a pressure oil inlet and an oil outlet therethrough communicating with said cylindrical housing and a thin accordion fold metallic liner means in said cylindrical housing forming a plurality of axially disposed radially extending oil passages therein, the axially disposed radially outer portion of said liner walls being apertured to provide a restricted circumferential flow of oil between said adjacent radially extending oil passages, the radial inner portion of said liner walls being formed adjacent said crankshaft to provide communication between alternate radially disposed oil passages and said pressure oil inlet and between adjacent alternate radially disposed oil passages and said oil outlet.

A further object of the invention is to provide a centrifugal type oil cleaner and vibration dampener for internal combustion engines consisting of a rotating hub on the engine crankshaft having axially spaced annular oil inlet and outlet grooves therearound communicating with oil inlet and outlet passages in the engine crankshaft connected in series with the pressure flow lubricating oil system of said engine, a disc shaped cylindrical housing fixed on said hub over said oil passages, and a thin wall accordion fold metallic liner means in said cylindrical housing forming a plurality of axially disposed radially extending oil passages therein, the axially disposed radially outer portion of said liner walls being apertured to provide a restricted circumferential flow of oil between adjacent radially extending oil passages, the radial inner portion of said liner walls being crimped adjacent said hub to provide communication between alternate radially disposed oil passages and said inlet groove and between adjacent alternate radially disposed oil passages and said outlet groove.

Other objects of the invention will become apparent by reference to the following detailed description taken in connection with the accompanying drawings, in which:

FIG. 1 is a longitudinal sectional view through a centrifugal oil cleaner-vibration dampener embodying the invention.

FIG. 2 is a cross sectional view taken on the line 2—2 of FIG. 1.

FIG. 3 is an arcuate elevational view taken on the lines 3—3 of FIGS. 1 and 4 showing the inner ends of the continuous accordion fold liner construction preferably employed.

Figure 4:
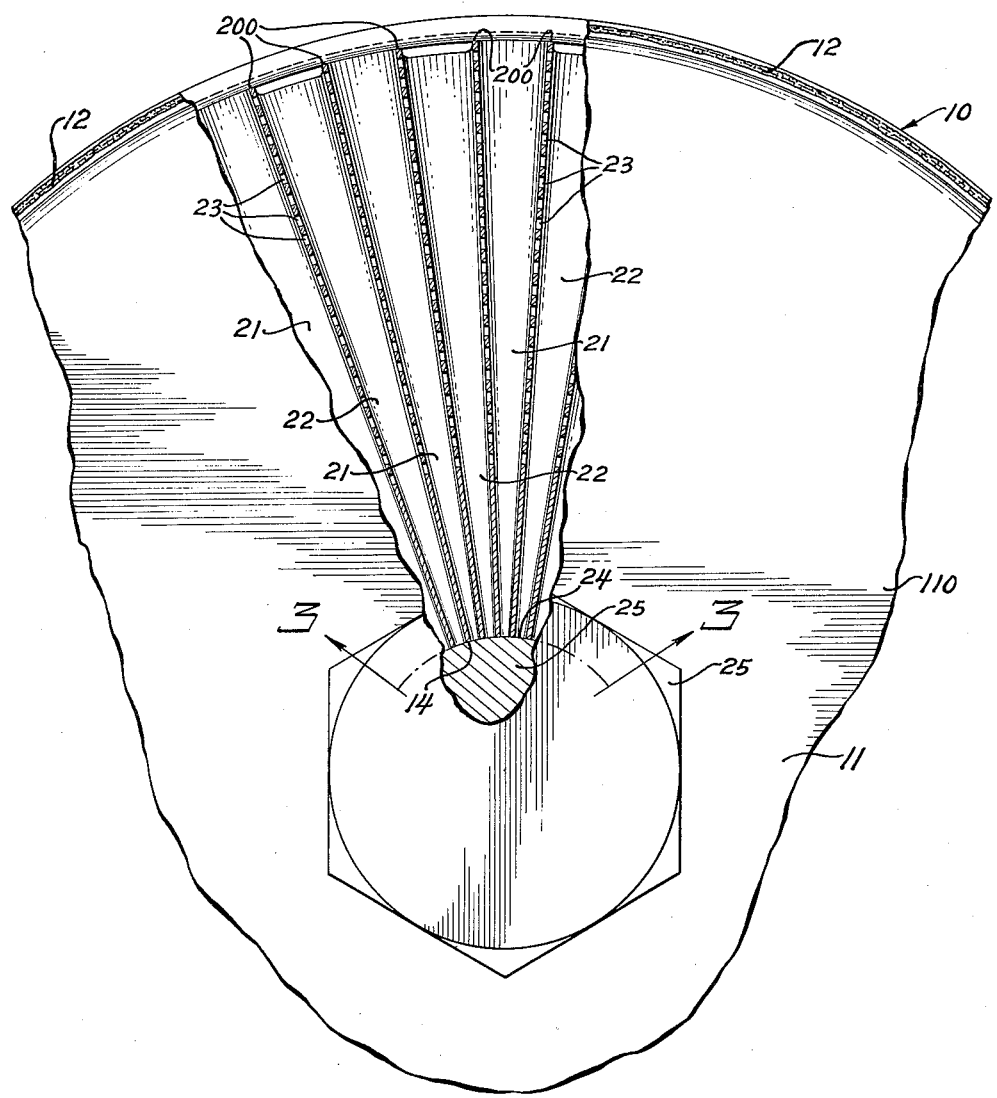
FIG. 4 is an enlarged fragmentary and elevational view of the centrifugal oil cleaner-vibration dampener disclosed in FIG. 1 with a portion of the housing broken away to clearly show the liner construction.

Referring now to the drawings wherein like numerals refer to like and corresponding parts throughout the several views, the centrifugal oil cleaner-vibration dampener 10 disclosed for the purpose of illustrating the invention preferably consists of a relatively flat radially tapered cylindrical hollow disc shaped housing 11 formed of two axially disposed dish shaped elements 110 and 111 preferably secured together at their outer periphery by such means as welding 12 along juxtaposed radially extending peripheral flanges thereof as best shown in FIG. 1. The front dish shaped element 110 is preferably formed to provide an annular seat 13 around a central axially disposed aperture 14 therein, and the dish shaped element 111 is preferably formed to provide an annular axially extending collar 15, all as indicated in FIG. 1.

Within the said hollow cylindrical housing 11 are a plurality of alternate radially disposed oil passages 21 and 22 preferably formed by means of a disc shaped accordion folded liner element 20 which has a central aperture 24 therethrough to accommodate a securing nut 25 which has a shank 250 and a hollow stem 251. The said securing nut 25 is exteriorly threaded at its hollow stem 251 into the end of an engine crankshaft 26 as best shown in FIG. 1. The outer periphery 200 of the liner element 20 abuts the inner surface of the outer peripheral wall 113 of the hollow disc shaped housing 11.

The said hollow tapered cylindrical housing 11 of the centrifugal oil cleaner-vibration dampener 10 is completely filled by the thin wall accordion folded liner element 20 which forms narrow alternate radially disposed oil passages 21 and 22 within the said housing 11. The outer peripheral edge 200 of the liner element 20 abuts against the inner face of the outer periphery of the housing 11. The radial outer portion of the axially and radially disposed walls of the liner element 20 is provided with a plurality of relatively small orifices 23 through which oil may pass from each of the said radially disposed oil passages 21 to adjacent radially disposed oil passages 22. The said liner element 20 is formed with a central aperture 24 therethrough of a proper size to telescope over the shank 250 of a securing nut 25 employed to permit mounting of the centrifugal oil cleaner-vibration dampener 10 on the end of a crankshaft 26.

The forward radially inner corner 201 of alternate loops of the accordion folded liner 20 are pinched together as best shown in FIGS. 1 and 2 whereby to form alternate oil inlet passages 210 and alternate oil outlet passages 220 to and from the adjacent radial extending oil passages 21 and 22 respectively of the said centrifugal oil cleaner and vibration dampener 10.

Although the use of the thin wall accordion fold liner element 20 is preferable to provide the desired radial extending oil passages 21 and 22 within the housing 11 with communicating orifices 23 therebetween, other partitioning means may be employed to provide like and similar oil passages in the said housing 11.

The oil cleaner and vibration dampener 10 may be mounted on the end of an engine crankshaft 26 or the like in any suitable manner to provide a series hydraulic connection of the oil inlet and outlet passages 21 and 22 of the said oil cleaner 10 in the pressure lubricating oil circulating system of the engine. A typical installation of an oil cleaner and vibration dampener 10 embodying the invention on the end of an engine crankshaft is shown in the drawings and will now be described.

In the particular mounting of the oil cleaner-vibration dampener 10 shown in the drawings for illustrative purposes, the engine crankshaft 26 is provided with a plurality of longitudinal pressure oil passages 261 therein. An interiorly splined accessory drive gear 27 and an interiorly splined collar 28 are telescoped on the reduced exteriorly splined portion 262 of the engine crankshaft 26. Certain of the splines of the said accessory drive gear 27 and the collar 28 are omitted to provide longitudinal oil passages 263 which extend from the engine shaft pressure oil passages 261 to an annular pressure oil distribution passage 29 located between the outer end of the splined collar 28 and the accordion folded liner element 20 of the oil cleaner-vibration dampener 10. This annular pressure oil distribution passage 29 communicates with the pressure oil inlet passages 210 to the radial extending oil passages 21 of the oil cleaner and vibration dampener 10.

The engine crankshaft 26 is provided with a suitable axial oil return bore 264 therein into which the stem end 251 of the shank 250 of the oil cleaner-vibration dampener securing nut 25 is threaded. The exterior of the shank 250 of the securing nut 25 is circumferentially grooved near the front or head end thereof to provide an annular oil return collector passage 252 opposite the oil outlet passages 220 from the radial extending oil passages 22 of the oil cleaner and vibration dampener 10. Suitable radial communicating bores 253 are provided in the securing nut 25 between the annular oil return collector passage 252 and a longitudinal bore 254 therein extending inwardly from the stem end 251 thereof.

The outer periphery of the splined collar 28 is provided with an axially grooved annular boss 280 into which is telescoped the collar 15 of the rear housing portion 111 of the housing 11 of the oil cleaner and vibration dampener 10. A suitable sealing washer 32 is provided between the hub 270 of the accessory driving gear 27 and the axially facing shoulder 265 of the crankshaft 26. A suitable sealing washer 33 is provided between the said driving gear hub 270 and the adjacent end of the collar 28. A suitable combined sealing and lock washer 31 is positioned between the underside of the head 254 of the securing nut 25 and the annular seat 13 of the front housing portion 110 of the housing 11. With the hereinabove described construction, the tightening of the securing nut 25 accomplishes a suitable mechanical fixing of the oil cleaner-vibration dampener 10 to the engine crankshaft 26, and at the same time, the said oil cleaner-vibration dampener 10 is hydraulically connected into the engine oil pressure circulating system. Obviously, any other convenient means may be employed for mounting the oil cleaner-vibration dampener 10 on the crankshaft 26 of an internal combustion engine and connecting it hydraulically in the engine oil pressure circulating system.

When in operation, the centrifugal oil separator-vibration dampener 10 has a flow of oil therethrough from an engine pressure oil passage to and axially through the oil passages 21 therein, circumferentially through orifices 23 in the walls forming the said oil passages 21 to adjacent oil passages 22, and axially from said oil passages 22 back to a return engine oil passage. The rotating of the said centrifugal oil separator-vibration dampener 10 causes separation of sludge including heavier-than-oil foreign particles from the engine oil circulating therethrough, which sludge deposits in the outer periphery of the housing 11, and there remains.

The oil separator-vibration dampener 10 will normally function properly for upwards of 50,000 to 100,000 miles of vehicle engine operation, all according to its size, at which time the sludge deposits will fill the housing 11 approximately to the dot and dash line 40 in FIG. 1. The oil separator-vibration dampener 10 may then be removed, the sludge cleaned therefrom, and replaced, or, a new oil separator-vibration dampener 10 may be installed in its place. If desired, the oil separator-vibration dampener 10 may be cleaned at the end of a shorter service period, for example, at 25,000 to 50,000 miles of vehicle engine operation.

The said oil separator-vibration dampener 10 effectively performs its vibration dampening function at all times when the vehicle engine is running by the relative movement of oil through the orifices 23 in the radial outer portion of the axially and radially disposed thin walls of the thin walled accordion folded liner element 20 in a direction opposite to the vibrational movement. By use of a thin wall liner element 20 with a suitably orificed radial outer portion of the axially and radially disposed thin walls thereof, oil passing through the orifice produces the desired dampening effect relatively independent of the viscosity of the oil.

Although but one embodiment of the invention has been disclosed and described in detail, it is obvious that many changes may be made in the size, shape, arrangement and detail of the various elements of the invention, all without departing from the spirit and scope thereof as defined by the appended claims.

I claim:

1. A centrifugal oil cleaner and vibration dampener in combination with and for use on a rotating shaft having pressure oil inlet and outlet ports therein comprising a cylindrical disc shaped hollow housing including an annular hub, means mounting said hollow housing at its hub in sealed relationship on said rotating shaft in communication with said oil inlet and outlet ports therein, a plurality of closely spaced radially and axially disposed partitions in said housing extending from said hub to the periphery thereof forming radially extending oil passages therein, said partitions being crimped together alternately at said hub to provide communication between alternate radial oil passages and said oil inlet and outlet ports, the said partitions having a plurality of closely spaced oil apertures through at least the outer one-third thereof to admit of movement of oil circumferentially between alternate radially extending oil passages, the said oil apertures being sufficiently small to provide a restricted flow of oil between alternate radial oil passages outwardly of said hub.

2. A centrifugal oil cleaner and vibration dampener in combination with and for use on a rotating shaft having pressure oil inlet and outlet ports therein comprising a hollow disc shaped tapered housing including an annular hub, said housing being thinner at its outer periphery than at its hub, means mounting said hollow housing at its hub on said rotating shaft in sealed relationship over said ports therein, an accordion fold partition in said housing forming a plurality of axially disposed radially extending oil passages therein, the said accordion fold partition having a plurality of oil orifices therein near the outer portion thereof permitting a flow of oil circumferentially between said oil passages, said accordion fold partition being crimped at said hub to provide communication between alternate radially extending oil passages and said inlet and outlet ports of said rotating shaft, said oil orifices in said accordion fold partition being of such size as to restrict the flow of oil passing therethrough whereby to provide a vibration dampening effect.

3. A centrifugal oil cleaner in combination with and for use on a rotating shaft having pressure oil inlet and outlet passages therein, a hollow disc shaped tapered housing including an annular hub and thinner at its outer periphery than at its annular hub, nut means mounting the said housing at its hub on said rotatable shaft over said pressure oil inlet and outlet ports therein, an accordion fold partition in said housing forming a plurality of axially disposed radially extending oil passages therein, the radial outer portion of the said accordion fold partition having a plurality of closely spaced oil orifices therein permitting a circumferential flow of oil between said oil passages, alternate folds of said accordion fold partition being crimped adjacent said hub to provide communication between alternate radially extending oil passages and said inlet and outlet ports, said oil orifices in said partitions being of such size as to sufficiently restrict the circumferential flow of oil between alternate oil compartments to provide in addition to the oil cleaning function of the oil cleaner a vibration dampening effect to the rotatable shaft on which it is mounted.

References Cited in the file of this patent

UNITED STATES PATENTS

| | | |
|---|---|---|
| 717,385 | Gathmann | Dec. 30, 1902 |
| 1,678,272 | Rushmore | July 24, 1928 |
| 2,473,701 | Bullock | June 21, 1949 |